United States Patent [19]
Broughton

[11] 4,013,232
[45] Mar. 22, 1977

[54] DISPERSION OF PIGMENTS BY CRYOGENIC ATTRITION

[75] Inventor: Lewis Broughton, Stockport, England

[73] Assignee: National Research Development Corporation, London, England

[22] Filed: Jan. 6, 1976

[21] Appl. No.: 646,749

[52] U.S. Cl. .................. 241/3; 241/14; 241/17

[51] Int. Cl.² .......................... B02C 23/06

[58] Field of Search ............ 241/3, 14, 17, 22, 23

[56] References Cited

UNITED STATES PATENTS

| | | | |
|---|---|---|---|
| 2,100,151 | 11/1937 | Tietz | 241/3 X |
| 2,836,368 | 5/1958 | McCoy | 241/17 |
| 2,841,339 | 7/1958 | Gilmore | 241/17 X |
| 2,893,216 | 7/1959 | Seefeldt et al. | 241/17 X |
| 3,072,347 | 1/1963 | Dombrowski | 241/3 |

Primary Examiner—Granville Y. Custer, Jr.
Attorney, Agent, or Firm—Ross, Ross & Flavin

[57] ABSTRACT

In order to disperse a pigmented filtercake, i.e. break up the pigment into fine particles suspended in water, a mixture of filtercake, water and a stabilizer are subjected to ice particles. The mixture of ice particles, filtercake and water are then agitated and the particles of ice act as an abrasive to break up and disperse the pigment. The stabilizer prevents the dispersed particles from re-agglomerating. The process is continuous in that the water is bled off and flowed through an ice flaker where the ice particles are formed preparatory to return to the mixture, all until the dispersion has reached the desired degree.

8 Claims, 5 Drawing Figures

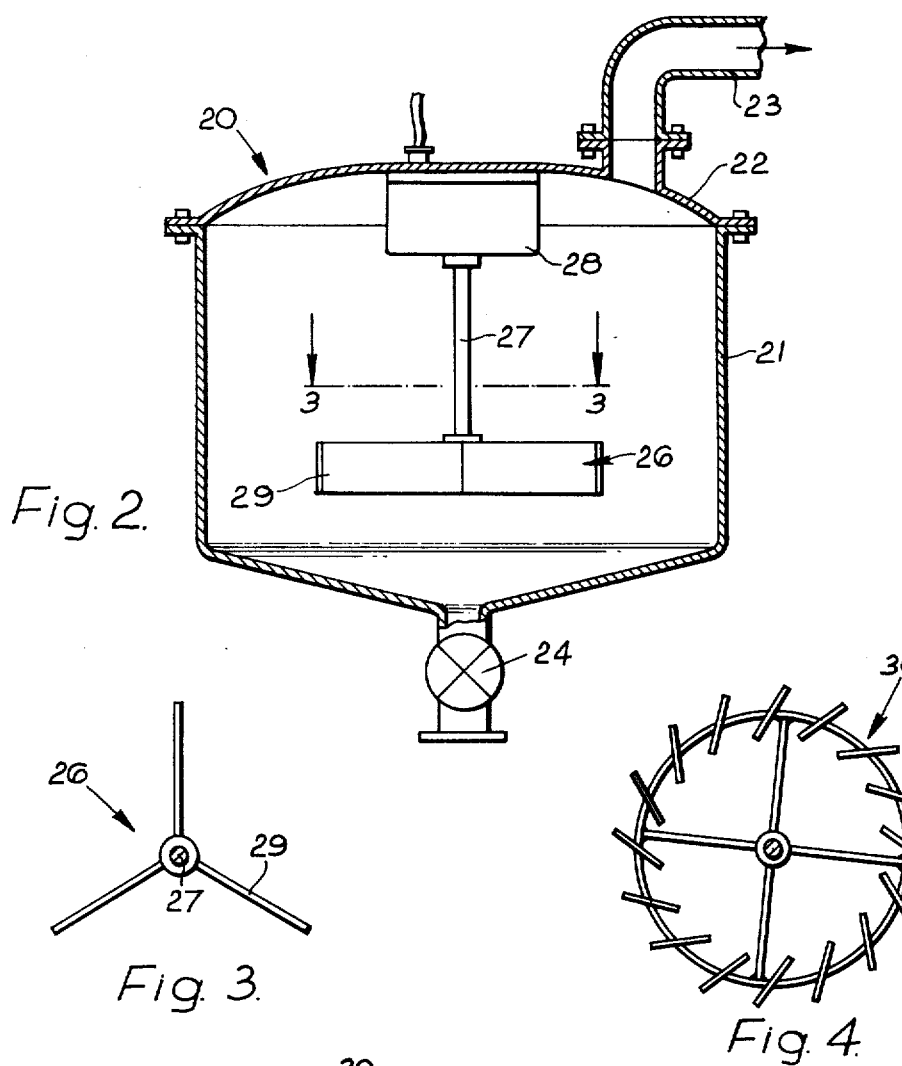
Fig. 2.
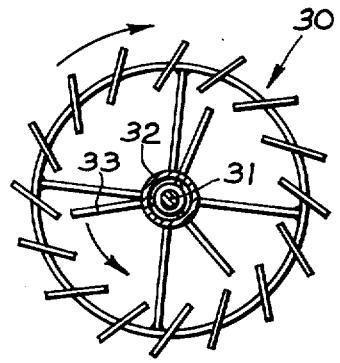
Fig. 3.
Fig. 4.
Fig. 5.

DISPERSION OF PIGMENTS BY CRYOGENIC ATTRITION

FIELD OF THE INVENTION

This invention relates to the preparation of dispersions of pigment in water by deflocculating aqueous filtercake pastes of the pigment.

OBJECT OF THE INVENTION

An object of the invention is to afford a method of preparing highly dispersed forms of pigments offering maximum tinctorial value, whilst conserving the low levels of hygroscopicity normally associated with less highly dispersed pigments.

BRIEF STATEMENT OF THE INVENTION

In accordance with the invention, there is provided a method of dispersing an organic pigment in water comprising: subjecting a fluidised filtercake of the pigment with a stabiliser to freezing part of the water present, and agitating the mixture of ice, pigment and water.

This may be achieved either by subjecting the mass of the filtercake to alternate freezing and agitating cycles, or preferably by filtering off water containing the dispersed pigment, freezing this liquid, introducing the ice thus formed to the paste and agitating the mixture, the ice being melted by heat generated by the agitation, with the resulting liquid again being withdrawn and refrozen, so that a continuous cycle operates. The ice particles, in combination with the agitating and shearing forces generated thereby, effectively act as an abrasive, which in temperatures near 0° C, cause a deflocculation of pigment particles to give an increasingly fine dispersion.

The filtercake normally contains 20 to 30% pigment of in a highly flocculated state, the remaining 70 to 80% of the filtercake being water. The filtercake should be partially dispersed or deflocculated in the presence of a stabiliser whose functions are to reduce interfacial energy and prevent particles of pigment from sticking to each other in conditions of close proximity.

Agitation is preferably carried out by a rotary agitating blade, which is rotated in a pigment-ice mixture to create the agitating and shearing forces within the mixture.

The stabiliser confers substantial freeze-thaw stability on the pigment dispersion. Polyvinylpyrrolidone has been found to be an effective stabiliser for a wide range of organic pigments, when used in the process of the invention. The grade of polymer used is important, grades having a molecular weight of 160,000 appearing most widely effective. The amount of polyvinylpyrrolidone required to stabilise the pigment is usually in the range of 1 to 10% of the weight of the pigment contained in the filtercake. As an alternative, Hydroxy Propyl Methyl Cellulose, in a proportion of 1 part to 100 parts of filtercake, can be used.

In the process, a crude dispersion is prepared from the requisite filtercake paste by subjecting the paste to the shearing forces on a rotary mixer disperser in the presence of a suitable quantity of a surface-active stabiliser, e.g. polyvinylpyrrolidone. The dispersion proceeds to the extent that the paste is converted into a free flowing low viscosity fluid, substantially free of lumps of paste. The dispersion so prepared is then transferred to an apparatus such as will be described hereinafter.

DESCRIPTION OF A PREFERRED EMBODIMENT

Preferred embodiments of apparatus for use in the process according to the invention are shown in the accompanying drawings, wherein:

FIG. 1 is a schematic drawing of a first preferred embodiment of;

FIG. 2 is a cross-section through a second preferred embodiment;

FIG. 3 is a view in the direction of the arrows 3—3 in FIG. 2; and

FIGS. 4 and 5 are views similar to that of FIG. 3 but showing modified impellers.

Figure 1:
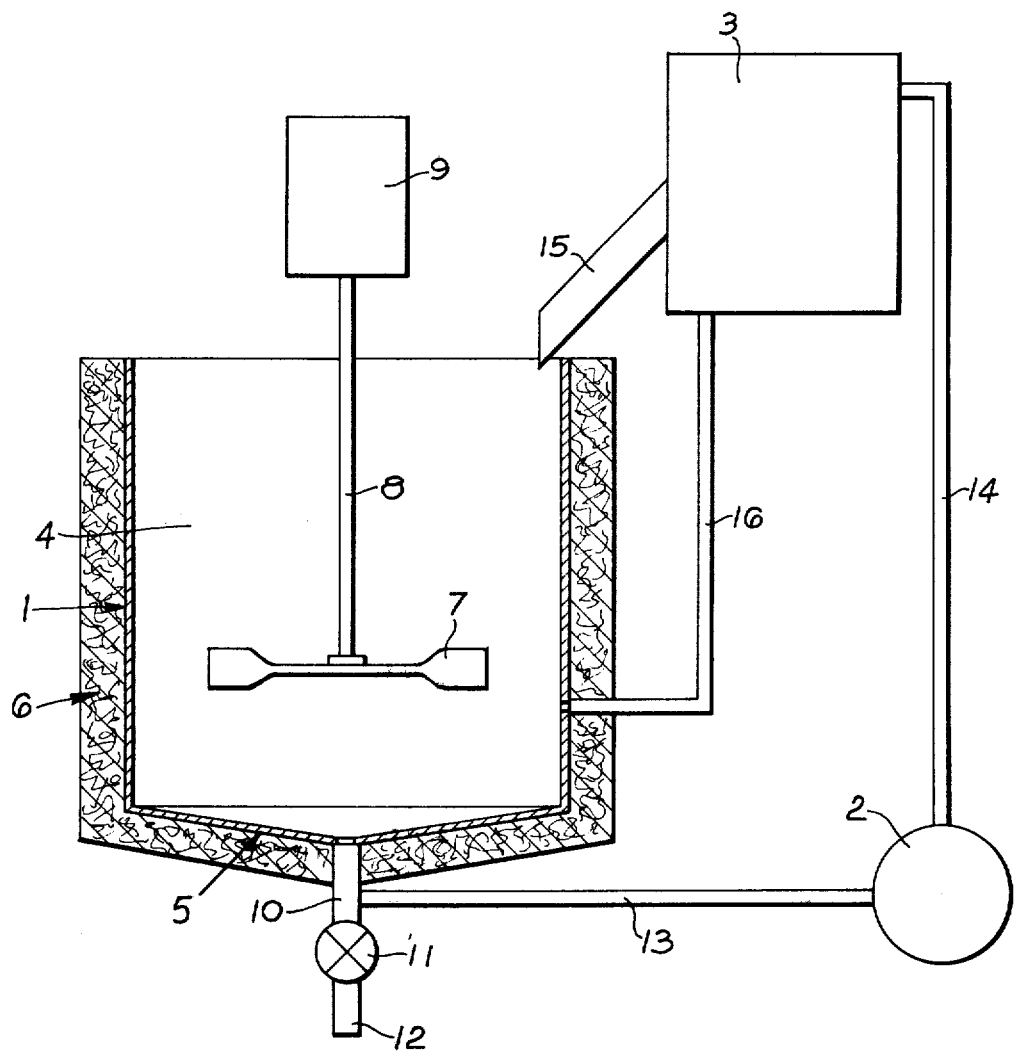

In FIG. 1, numeral 1 denotes an attrition chamber or cell, 2 is a pump, and 3 is a flake-ice machine. The cell 1 has a thermal insulation shell 6, to prevent ambient heat from being absorbed by the cell. A bladed rotor or impeller 7, on a shaft 8 connected to a motor 9 is located in an upper part 4 of the cell 1.

A conduit 10 leads from a lower part 5 of the cell 1 through a drain-valve 11 to a discharge point 12. A branch conduit 13 leads to pump 2, and a further conduit 14 leads from pump 2 to flake-ice machine 3. A chute 15 leads from the flake-ice machine 3 to the upper part 4 of the cell 1. A conduit 16 also leads from flake-ice machine 3 to the cell 1, to lead off any overflow of unfrozen liquid.

In use of the apparatus, in the process according to the invention, firstly a charge of pigment filtercake fluidised with dispersing agents, is introduced into the upper part 4 of cell 1. Valve 11 is closed, and pump 2 is activated. Some of the liquid is drawn by the pump 2 along conduit 13, and then impelled along conduit 14 to the flake-ice machine 3, where a large proportion of the liquid is frozen into the form of ice flakes. The ice flakes are returned to the cell 1 by chute 15, while any unfrozen liquid returns by conduit 16.

When an appreciable proportion of ice flakes, e.g. about half the mass in the cell, has accumulated in the cell, the motor 9 is switched on, and the impeller 7 rotates while buried within the mass of pigment. The rotation of impeller 7 causes agitation of the pigment, ice and water mixture, and in particular, shearing forces arise between different parts of the charge. The ice flakes act as abrasive particles to cause deflocculation of the pigment particles which makes for a high degree of dispersion of the pigment.

The agitation causes a remelting of the ice, and the liquid is recycled, to provide a continuous supply of fresh ice.

The process is continued as long as is deemed necessary, the actual time to disperse the charge inside the cell depending on the efficiency at which the impeller is operating, the power to weight ratio of the disperser/-charge and the rated output of the ice-flaker relative to the size of the charge inside the cell. The disperser may be operated until such time as all the ice present inside the cell has been thawed.

When the degree of dispersion is sufficient, i.e. the process is complete, the ice-maker and/or the pump 2 are, of course, switched off. At this stage (a) the impeller can be left running until all the ice has melted (b) the charge can be left to let ambient heat melt the ice or (c) the charge can be led from the container with some ice still in it, provided the ice does not interfere with free flow of the charge. Steps (a) and (b) are usual.

Alternatively, the remaining ice inside the cell may be thawed by the application of heat, e.g. by passing live steam into the cell with gentle agitation.

When the process is judged to be complete, for example, after the lapse of a specified time, valve 11 is opened to drain off the liquid from the cell, and the dispersed charge is removed.

When the process is complete (and ice melted) the charge is a free-flowing liquid of the consistency of milk. As here used, the word "liquid" is synonymous with the word "charge". The valve is opened and the liquid charge allowed to flow from the container.

With Azo dyestuffs, the process has outstanding application. Due to the more hydrophobic nature of organic pigments, the type of stabiliser employed is all important, the use of polyvinylpyrrolidone being generally effective to a superior degree. The process has been found to be applicable to a range of organic pigments which include:

| Common Name | Colour Index Reference |
|---|---|
| Hansa (Registered Trade Mark) Yellow G | C.I.P. Yellow 1 |
| Hansa (Registered Trade Mark) Yellow 5G | C.I.P. Yellow 74 |
| Hansa (Registered Trade Mark) Yellow R | C.I.P. Yellow 10 |
| Naphthol Orange 2G | C.I.P. Orange 5 |
| Naphthanilide Red | C.I.P. Red 9 |
| Naphthanilide Red | C.I.P. Red 112 |
| Naphthanilide Crimson | C.I.P. Red 5 |

The range is exemplary and by no means complete in respect of the applicability of the process.

EXAMPLE 1

To 1,400 g. of filtercake containing 31.0% of a pigment corresponding to colour index pigment Yellow 74, was added 6.0% polyvinylpyrrolidone as a 45% solution in water, calculated on the weight of pigment contained in the filtercake. The composition was then:

| C.I. Pigment Yellow 74 | 30.0% |
|---|---|
| P.V.P. Mol. Wt. 160,000 | 1.8% |
| Water | 68.2% |

The filtercake paste was then fluidised by the application of shearing forces on a laboratory cavitation disperser. Dispersion proceeded for a period of 10 mins. whilst the impeller was operated at a peripheral speed of 330 meters/min.

The dispersion so produced was then transferred to the apparatus of FIG. 1 and dispersed according to the method described. The important physical parameters were as follows:

| Mass of material being dispersed | 1.4 kg |
|---|---|
| Time taken to impart mechanical energy | 10 mins. |
| Peripheral speed of impeller | 1,000 m/min. |
| Temperature during dispersion | 273° K (0° C) |
| Total energy consumed by shearing equipment and refrigerator | 0.7 Kw/hrs |

The completed dispersion was analysed for particle size distribution using a "Simcar" disc centrifuge. 96% of the particles had sizes in the range 0.2 to 0.3 microns, with a small residue of 4% at 5 microns.

EXAMPLE 2

100 parts of Arylamide Yellow G Filtercake containing 25 parts of pigment (of a particle size in a fairly narrow band around 0.3 microns), was treated, in an initial dispersing step, in the same way as the same of Example 1. To the dispersion so produced was added 1 part of Hydroxy propyl methyl cellulose and the mixture transferred to the apparatus of FIG. 1. The mixture, after freezing as before, was agitated for three minutes with the rotor having a peripheral speed of 2,000 ft/min. Residual ice was allowed to thaw by adsorbing ambient heat.

A particle size analysis of the resulting dispersion showed 97% of the particles to be 0.3 microns.

A second preferred embodiment of apparatus 20 comprises a cell 21 which can be rendered vacuum tight by means of a lid 22 connected to a pipe 23 leading to a vacuum pump (not shown). A fluid and vacuum tight drain valve 24 is arranged at the lower end of the cell 21. An impeller 26 carried by a shaft 27 is driven by a canned motor 28 mounted inside the vacuum vessel to obviate the need for a rotary vacuum sealing gland through the lid 22.

The second embodiment works in a very similar manner to that of FIG. 1, the only difference being that the flake ice machine is dispensed with and freezing is effected by the application of high vacuum to the liquid. Evaporation of water from the liquid causes it to cool and some thereof eventually freezes. When a sufficient amount of water has frozen, say about 50% thereof, the impeller is actuated to cause dispersion in exactly the same way as in the apparatus of the first embodiment. The vacuum can be maintained during agitation to keep about half the water frozen, i.e. to replace ice melted by the heat supplied by the impeller.

As shown in FIG. 3, the impeller 26 can have three blades 29. Alternatively (as shown in FIG. 4), an impeller 30 can have a large number of blades at the periphery of a circle. FIG. 5 illustrates how the shaft 27 can have a central solid rod 31 rotating an impeller such as impeller 30 in one direction and a surrounding tube 32 driving an impeller 33, similar to impeller 26, in the opposite direction. The mutual rotation of the two impellers 30 and 33 can be achieved through a gear box inside the motor casing.

I claim:

1. A method of forming a dispersion of an organic pigment in water consisting of the steps:
    first, forming a water-containing filter cake and reducing it to a fluid mass,
    second, adding a surface-active stabilizing agent to the fluid mass,
    third, causing a portion of the water present to freeze for forming ice particles,
    fourth, agitating the pigment-water-stabilizing agent-ice mixture.

2. The method according to claim 1, wherein agitation is performed by rotation of a cavitation impeller.

3. The method according to claim 1, wherein the surface active stabilising agent is polyvinylpyrrolidone.

4. The method according to claim 1, wherein the surface active stabilising agent is Hydroxy Propyl Methyl Cellulose.

5. The method as claimed in claim 1, wherein, the fluidised filtercake is placed in a vacuum tight cell and vacuum applied to effect freezing of part of the water present to form ice particles.

6. In the method according to claim 1, wherein the said pigmented filter cake is continuously reduced into the said fluid mass by agitating it and subjecting it to the shearing forces of a rotary mixer, and wherein the liquid of the fluid mass is continuously separated out and frozen and returned in the form of the said ice particles.

7. In the method according to claim 6, wherein the said liquid is formed into ice particles in a flake ice machine.

8. A method of treating an organic pigment in a water-containing filtercake form for making a dispersion thereof in water consisting of the steps:
- first, adding a surface-active stabilizing agent to the filtercake,
- second, forming the filtercake into a fluid mass,
- third, causing a portion of the water present to freeze for forming ice particles,
- fourth, agitating the pigment-water-stabilizing agent-ice mixture.

* * * * *